April 27, 1937.  J. E. LANDIS  2,078,860
DAIRYMAN'S AIR RELIEF TOOL
Filed March 19, 1936
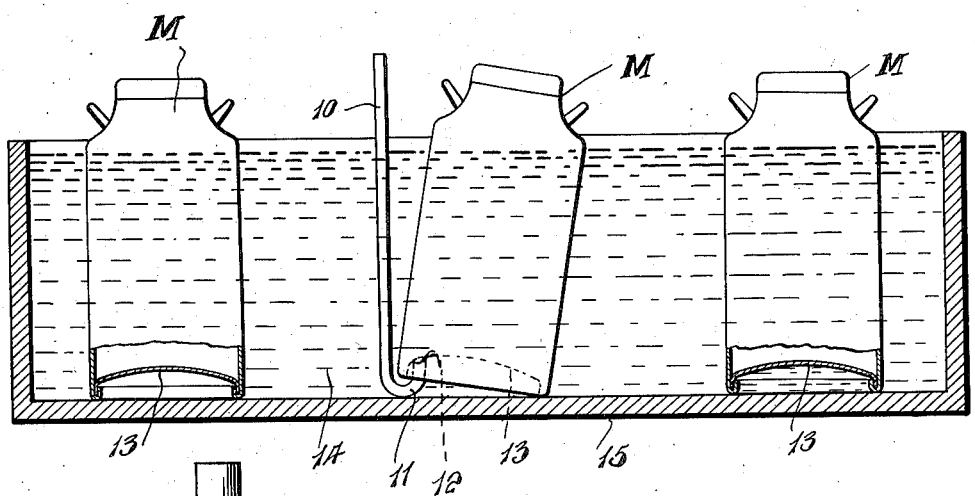
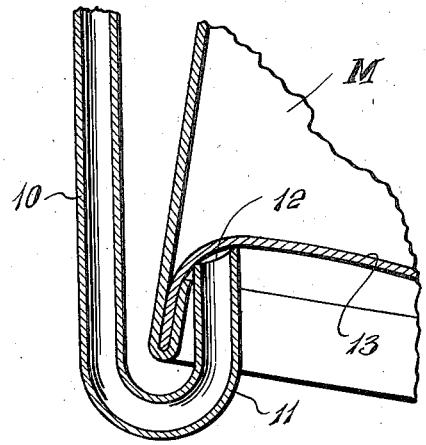
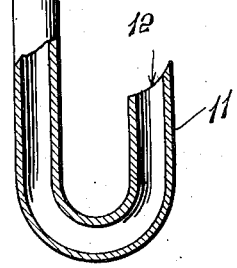
Inventor
John E. Landis
By L. F. Randolph Jr.
Attorney Patented Apr. 27, 1937

2,078,860

UNITED STATES PATENT OFFICE 2,078,860

DAIRYMAN'S AIR-RELIEF TOOL

John Elmer Landis, Macy, Ind.

Application March 19, 1936, Serial No. 69,695

5 Claims. (Cl. 31—4)

This invention relates to a tool for use by dairymen releasing or relieving air which is trapped between the bottom of milk cans and the bottom of tanks containing a cooling liquid in which the milk cans are placed. Milk dealers at the present time insist upon milk to be cooled to sixty (60) degrees F. in not over thirty (30) minutes after milking the animal, since bacteria multiply rapidly in warm milk and cause it to spoil or sour. As milk cans are constructed at the present time, there is an upward depression or cavity at the bottom of the can which traps air when the can is placed in a body of cooling water, which air serves to insulate the bottom of the can so that the heat is not dissipated into the water as rapidly as desired. It is the primary object of the present invention to provide a means which will enable such trapped air to be released or relieved, in order to reduce the length of time necessary in the cooling of the milk, in order to meet the trade requirements.

It is further aimed to provide a means for effecting the result in question comprising a hollow tube, having a hook or crook at one end thereof with the terminal wall at such end disposed irregular or out of a plane.

The more specific objects and advantages will become apparent from a consideration of the description following taken in connection with accompanying drawing illustrating an operative embodiment.

In said drawing:—

Figure 1 is a view partly in section and partly in elevation, illustrating the use of my invention in connection with milk cans contained in a tank of cooling water;

Figure 2 an enlarged sectional detail showing the tool in engagement with a milk can and Figure 3 is a view partly in elevation and partly in section of the tool.

Referring specifically to the drawing wherein like reference characters designate like or similar parts, the tool employed consists of a hollow metallic element or tube 10 having a bore open to the atmosphere at both ends. Said tube has a hook or crook 11 at its lower end and the terminal wall of such hook or crook as at 12 is concave, irregular or otherwise located out of a flat plane, to the end that it cannot be closed through contact with the wall of a milk can.

As milk cans are constructed at the present time, they have raised bottoms, depressions or concavities at 13 and when they are placed in cooling water 14, as in a tank 15, a spring or otherwise, air is trapped by such concavity engaging the bottom wall of the tank as shown by the left hand milk can M, in Figure 1.

In accordance with my invention, trapped air may be released or relieved by the pressure of the water 14. To this end, the milk can, for instance the middle one as shown in Figure 1, is tilted and with one finger closing and sealing the upper end of the tube 10, such tube is disposed in the positions of Figures 1 and 2 then released, that is, the finger is removed from the upper end of the tube and the air beneath the can, through the pressure of the water, enters the tube at the end 12 and escapes from the tube at the upper end, water following the air into the tube. Following this release of the air, the tool is removed and the milk can permitted to again rest flatly on the bottom of the tank with water, rather than air filling the concavity 13. The uneven edge 12 effectively prevents such contact of the hook with the milk can as to prevent the escape of the air.

Various changes may be resorted to provided they fall within the spirit and scope of the invention.

I claim as my invention:—

1. An air relieving tool of the class described, comprising a tube usable exteriorly of a milk can or the like, said tube having its bore open at both ends, one end portion of said tube being a crook adapted to fulcrum on the support for the milk can to enter the free end of the crook beneath the can.

2. An air relieving tool of the class described, comprising a tube usable exteriorly of a milk can or the like, said tube having its bore open at both ends, one end portion of said tube being a crook adapted to fulcrum on the support for the milk can to enter the free end of the crook beneath the can, the end wall of said crook being located out of a plane surface.

3. An air relieving tool of the class described, comprising a tube usable exteriorly of a milk can or the like, said tube having its bore open at both ends, one end portion of said tube being a crook adapted to fulcrum on the support for the milk can to enter the free end of the crook beneath the can, the free end wall of said crook being out of right angular relation to the longitudinal axis.

4. An air relieving metallic tool of the class described, comprising a tube usable exteriorly of a milk can or the like, said tube having its bore open at both ends, one portion of said tube being a crook adapted to fulcrum on the support for the milk can to enter the free end of the crook beneath the can, the end wall of said crook being located out of a plane surface.

5. The method of releasing trapped air between a milk can or the like and the base of means containing a cooling fluid in which the can is placed, consisting in tilting the can and disposing a tube adjacent the zone of the trapped air while in communication with the atmosphere and in then lowering the can and displacing the tube.

JOHN E. LANDIS.